3,706,822
METHOD OF REFINING ESTERS OF
ORGANOPHOSPHORUS
James E. Caldwell, 535 Coppinger Drive, Ferguson, Mo.
63135, and Ronald R. Sorrell, Apt. 7, 4130 Geraldine,
St. Ann, Mo. 63074
No Drawing. Filed Oct. 2, 1969, Ser. No. 863,334
Int. Cl. C07f 9/08, 9/16, 9/40
U.S. Cl. 260—990                                                15 Claims

ABSTRACT OF THE DISCLOSURE

Organophosphorus acid esters of the formula

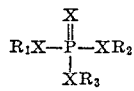

wherein $R_1$, $R_2$ and $R_3$ individually represent alkyl, aryl, alkaryl, aralkyl, haloalkyl, haloaryl, nitroalkyl, nitroaryl, alkoxyalkyl, alkoxyaryl, cyanoaryl, haloalkaryl and alkylthioalkyl, and X represents oxygen, sulfur, or a carbon-phosphorus bond, at least two of X being oxygen or sulfur, are prepared wherein certain wash-improving agents are added to the lye and/or water washes during the refining of the crude organophosphorus esters. The organophosphorus esters prepared by the method of this invention have utility as flexibilizing plasticizers for polyvinylchloride compositions, as synthetic lubricants and force transmission fluids, as film-forming addition agents for extreme pressure lubricants and as insecticides.

BACKGROUND OF THE INVENTION

This invention relates to an improved method of preparing organophosphorus acid esters. More particularly, this invention relates to an improved process for preparing certain organophosphorus acid esters of the general formula

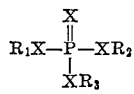
                                                                                                                                                                     I wherein $R_1$, $R_2$ and $R_3$ individually represent an alkyl group, an aryl group, an alkaryl group, an aralkyl group, an alkoxyalkyl group, an alkoxyaryl group, an haloaryl group, a haloalkyl group, a nitroalkyl group, a nitroaryl group, a cyanoaryl group, a haloalkaryl group or an alkylthioalkyl group and X represents oxygen, sulfur or a carbon-phosphorus bond, at least two of X being oxygen or sulfur. Hereafter, the use of the term "phosphorus ester" is intended to include only such compounds as fall within the above definition. The phosphorus esters prepared by the process of this invention range from generally nearly colorless liquids to solids. These esters have exceptional utility as flexibilizing plasticizers for polyvinyl chloride compositions, imparting to those compositions the combination of properties of flexibility at freezing temperatures, low volatility losses of plasticizers at higher temperature and nonflammable. Because of their very low pour points and very high autogenous ignition temperatures and their compatibility with paraffinic hydrocarbon oils, the phosphate esters may be used alone or in combination with paraffinic hydrocarbon oils to prepare hydraulic and torque converter fluids of highly desirable characteristics. Moreover, the phosphorus esters are known to have a wide variety of other uses, ranging from lubricants for mechanisms from delicate clockworks to extreme pressure bearing services, film-forming addition agents in hydrocarbon oils for use in extreme pressure lubricants, as liquid media for filters for air conditioning systems and as insecticides.

In all of the above-mentioned uses of the phosphorus esters prepared by the process of this invention, it is to be emphasized that high purity is required. For example, in their use as plasticizers for polyvinyl chloride, excess quantities of partial esters decrease the permanence of the plasticizer and the plasticized composition. Excessive quantities of partial esters and reaction side-products in such applications cause a decrease in the flexibility characteristics of the plasticized composition. Moreover, impurities cause substantial changes in the ignition temperatures of the esters and also substantial changes in the viscosity of the esters, thereby seriously affecting the utility of these esters as hydraulic and torque converter fluids.

The procedure for preparing the phosphorus esters defined above varies, depending on whether the ester is to be a phosphoric acid ester, a phosphonic acid ester, a phosphinic acid ester or a thiol analog thereof. These procedures are well known and readily available to those skilled in the art. For example, in the preparation of a phosphoric acid ester, the procedure will vary depending on whether an alkyl ester, an aryl ester or a mixed ester is desired. Thus, to prepare a triangle ester, an appropriate alcohol is added to phosphorus oxytrichloride with continuous stirring. The hydrogen chloride gas which is evolved is continuously removed by application of vacuum to the reaction vessel. After the reaction has been completed and the excess hydrogen chloride has been removed, the mixture is then separated and washed to remove partial esters and salts and to reduce the alkalinity of the reaction mass to neutral. The reaction mass is then further refined in accordance with methods well known to those skilled in the art of refining phosphorus esters. In order to prepare a mixed ester, i.e. alkylaryl ester, an alkyl alcohol, for example, is reacted with phosphorus oxytrichloride and, after the reaction is completed the reaction mixture is added to a medium containing an alkali metal salt of an aryl alcohol at a low temperature. Phosphonates and phosphonothioates are prepared by a number of procedures known in the art. For example, a substituted phosphonic dichloride (such as phenylphosphonic dichloride) is reacted with an appropriate alcohol at moderate temperature and reduced pressure. Similarly, phosphinates are phosphinothioates are prepared by procedures known in the art. Thus, a phosphinothioic chloride (e.g. dimethyl-phosphinithioic chloride) may be reacted with the sodium salt of a phenol to form the phosphinithioate. The washing and refining steps set forth above are then instituted. Normally, partial esters are formed during the reaction and these partial esters have the faculty of complexing with metal ions, e.g. calcium, magnesium, aluminum and iron, present in the lye and water washing solutions. The complex of the metal ions with the partial esters form a rag layer composed of rather large molecules which forms a troublesome emulsion. In one usual procedure wherein batch washing is utilized, this emulsion or rag is eliminated by the use of settling tanks wherein the lye and water-washed phosphorus ester solutions are allowed to remain until the complex of the partial ester with metal ions separates, whereupon the product layer is then removed. This procedure, however, is extremely time-consuming and cumbersome and is inoperable in large facilities wherein continuous washing procedures are utilized. In procedures utilizing a continuous washing cycle, there is little time for allowing gravity separation in a settling tank and other means must be employed to overcome the problem of the emulsion layer formed by the complexing of the partial esters with the metal ions present in the lye and washing waters.

Thus, the problems due to the formation of emulsions in the treatment tank and concomitant filter stoppage are, to a great extent, caused by the complexes of partial esters of the parent phosphorus acids with metal ions and by carbonates and phosphates with hydroxides of metal ions present in the wash waters, e.g. aluminum, calcium, magnesium and iron. Emission spectra analysis of the lye and water washes used in the refining of the phosphorus esters indicates that the metal ions in the washes are the source of the problem. Accordingly, a method is needed to overcome the complexing tendency of the metal ions with phosphorus esters.

SUMMARY OF THE INVENTION

In order to overcome the disadvantages and difficulties posed by the partial ester complexes formed with metal ions in the lye and water washing steps during the refining of phosphorus esters, it has been found that the addition of certain wash-improving agents substantially eliminates the troublesome emulsions formed by such partial ester complexes and allows faster batch washing and even continuous washing of the ester reaction mixture. The wash-improving agents utilized in accordance with the present invention include triethanolamine and ethylenediaminetetraacetic acid, diethylenetriaminepentaacetic acid, N-hydroxyethylenediaminetriacetic acid, alkanol glycines, nitrilotriacetic acid, the gamma and delta lactones of gluconic acid and the sodium, potassium and calcium salts thereof, including mixed salts, e.g. sodium/potassium, sodium/calcium thereof.

Accordingly, it is an object of this invention to provide a process for preparing organophosphorus esters wherein continuous washing of the reaction mixture is feasible.

Another object of this invention is to provide a method for producing organophosphorus esters wherein complexes of metal ions with partial esters formed during the reaction are inhibited during the lye and water washing of the reaction mixture.

A further object of this invention is to provide improved washing procedures for crude organophosphorus esters to afford enhanced layer separation and less entrainment of the product during separation of the aqueous layer.

Another object of this invention is to provide an improved washing procedure for crude organophosphorus esters which affords improved filtration and settling characteristics and eliminates the need of the usual acid washes.

DESCRIPTION OF THE PREFERRED EMBODIMENTS

In accordance with the present invention, the crude phosphorus ester reaction product which has been prepared by procedures known in the art is subjected to batch or continuous washing procedures wherein certain wash-improving agents are employed to substantially eliminate formation of partial ester/metal ion complexes formed during the lye and water washing of such phosphorus esters.

The phosphorus esters prepared in accordance with the present invention include those compounds which fall within the scope of Formula I, above. Exemplary of such phosphorus esters are:

2-ethylbutyl diphenyl phosphate,
2-methylpentyl dicresyl phosphate,
octyl dicresyl phosphate,
2-ethylhexyl dicresyl phosphate,
2-ethylhexyl di-p-cresyl phosphate,
isooctyl dicresyl phosphate,
isooctyl di-p-cresyl phosphate,
tris(2-ethylhexyl)phosphorothioate,
2-ethylhexyl diphenyl phosphate,
2-ethylhexyl diphenyl phosphorothioate,
octyl diphenyl phosphate,
isooctyl diphenyl phosphate,
nonyl diphenyl phosphate,
trimethylhexyl diphenyl phosphate,
nonyl dicresyl phosphate,
decyl dicresyl phosphate,
dodecyl diphenyl phosphate,
dodecyl dicresyl phosphate,
2-n-propylheptyl diphenyl phosphate,
hexoxyethyl diphenyl phosphate,
butoxyethyl diphenyl phosphate,
2-ethylbutoxyethyl dicresyl phosphate,
2-methylpentoxyethyl diphenyl phosphate,
n-hexoxyethyl dicresyl phosphate,
2-methylpentoxyethyl dicresyl phosphate,
oxtoxyethyl dicresyl phosphate,
2-ethylhexoxyethyl diphenyl phosphate,
isooctoxyethyl dicresyl phosphate,
2-ethylhexoxyethyl dicresyl phosphate,
n-oxtoxyethyl diphenyl phosphate,
nonoxyethyl dicresyl phosphate,
trimethylhexoxyethyl diphenyl phosphate,
n-decoxyethyl dicresyl phosphate,
2-n-propylheptoxyethyl dicresyl phosphate,
decoxyethyl diphenyl phosphate,
2-n-propylheptoxyethyl diphenyl phosphate,
dodecoxyethyl diphenyl phosphate,
dodecoxyethyl dicresyl phosphate,
butoxyethyl di-m-cresyl phosphate,
2-ethylhexoethyl di-m-cresyl phosphate,
butoxyethyl di(o-chlorophenyl) phosphate,
2-methylpentyl di(o-chlorophenyl) phosphate,
2-ethylhexyl di(o-chlorophenyl) phosphate,
2-n-propylheptyl di(o-chlorophenyl) phosphate,
dodecyl di(o-chlorophenyl) phosphate,
tridecyl diphenyl phosphate,
tridecyl di-m-cresyl phosphate,
tridecoxyethyl diphenyl phosphate,
tetradecyl di(o-chlorophenyl) phosphate,
tetradecyl di-p-cresyl phosphate,
tetradecoxyethyl diphenyl phosphate,
pentadecyl dicresyl phosphate,
pentadecyl diphenyl phosphate,
pentadecoxyethyl di(p-chlorophenyl) phosphate,
hexadecyl diphenyl phosphate,
hexadecyl di-m-cresyl phosphate,
hexadecoxyethyl di(o-chlorophenyl) phosphate,
heptadecyl diphenyl phosphate,
heptadecyl di-o-cresyl phosphate,
heptadecoxyethyl diphenyl phosphate,
octadecyl di(o-chlorophenyl) phosphate,
octadecyl di(o-chlorophenyl) phosphate,
octadecoxyethyl dicresyl phosphate,
isodecyl diphenyl phosphate,
dibutyl phenyl phosphate,
methyl diphenyl phosphate,
bis (2-ethylhexyl) phenyl phosphate,
undecyl diphenyl phosphate,
tributyl phosphate,
tris (butyoxyethyl) phosphate,
tris (2-ethylhexyl) phosphate,
triundecyl phosphate,
tricresyl phosphate,
tricresyl phosphorothioate,
cresyl diphenyl phosphate,
chlorophenyl diphenyl phosphate,
isopropylphenyl diphenyl phosphate,
cumylphenyl diphenyl phosphate,
xenyl diphenyl phosphate,
xylyl diphenyl diphosphate,
nonylphenyl diphenyl phosphate,
O,O-diethyl O-p-nitrophenyl phosphorothioate,
O,O-dimethyl O-p-nitrophenyl phosphorothioate,
O,O-diethyl S-(p-chlorophenylthio)-methyl phosphorodithioate,
dihexyl methylphosphonate,
di-2-ethylhexyl 2-ethylhexylphosphonate,
dioctyl phenylphosphonate,
O-ethyl O-p-nitrophenyl phenylphosphonothiate,
S-ethyl O-p-nitrophenyl phenylphosphonothiate,
diphenyl phenylphosphonate, dicresyl ethylphosphonate,
di(o-chlorophenyl) phenylphosphonate,
dibutoxyethyl phenylphosphonate,
O-ethylthioethyl O-methylethylphosphonothiate,
p-nitrophenyl dimethylphosphinate,
S-p-nitrophenyl diethylphosphinothioate,
S-p-nitrophenyl diethylphosphinothioate,
S-p-nitrophenyl dipropylphosphinothioate,
2-ethylhexyl dibutylphosphinate,
2-chloroethyl diphenylphosphinate,
phenyl methylethylphosphinate,
S-ethylthiomethyl diethylphosphinodithioate,
decyl diethylphosphinate,
pentadecyl dimethylphosphinate and the like.

The wash-improving agents which are utilized in accordance with the present invention include triethanolamine and ethylenediaminetetraacetic acid, diethylenetriaminepentaacetic acid, N - hydroxyethylenediaminetriacetic acid, alkanol glycines, nitrilotriacetic acid and the gamma and delta lactones of the gluconic acid, including the sodium, potassium and calcium salts thereof as well as the mixed salts thereof. Exemplary of such wash-improving agents are the mono-, di-, tri- and tetrasodium salts of ethylenediaminetetraacetic acid, the calcium-disodium salt of ethylenediaminetetraacetic acid, the tripotassium salt of ethylenediaminetetraacetic acid, the pentasodium salt of diethylenetriaminepentaacetic acid, the trisodium salt of N-hydroxyethylenediaminetriacetic acid, triethanolamine, ethylenediglycine disodium salt, diethyleneglycine sodium salts, the di- and trisodium salts of nitrilotriacetic acid, the gamma and delta lactones of gluconic acid, sodium gluconate and potassium gluconate.

The wash-improving agents may be added to the lye wash in an amount of from about 0.01% to about 10% or higher based on the weight of the phosphorus ester. The agents may also be added to a water wash solution in an amount of from about 0.01% to about 10% based on the weight of the phosphorus ester. The wash-improving agents may be added individually or as combinations of two or more thereof and are preferably added in an amount of from about 0.1% to about 0.5% based on the weight of the phosphorus ester.

The following examples will serve to illustrate certain specific embodiments within the scope of this invention and are not to be construed as limiting the scope thereof.

EXAMPLE 1

360 grams crude phosphate is washed five times at 45° C. with 350 gram portions of 50% aqueous sodium hydroxide. With each portion, the mixture is stirred for thirty minutes and allowed to settle for thirty minutes. The mixture is then washed with 350 grams water at 45° C., stirred for fifteen minutes and allowed to settle for fifteen minutes. The mixture is then given two additional sodium hydroxide washes and three additional water washes after steaming at 110–115° C. for thirty minutes. The material is then transferred to a glass-lined tank, washed with 350 grams of dilute sulfuric acid (0.875%), 350 grams aqueous sodium hydroxide and five 350 gram portions of water. The phosphate is then vacuum steamed at 5–10 mm. Hg at 90° C. for sixty minutes, WSS (water-soluble solids in product)=30 p.p.m. or less.

EXAMPLE 2

360 grams of crude phosphate is initially washed with a solution of 7 grams of an aqueous 50% lye solution and 1.5 grams of the tetrasodium salt of ethylenediaminetetraacetic acid in 355 grams water. The washing solution is combined with the crude phosphate ester at 55° C. to 60° C. and held for thirty minutes. The mixture is allowed to settle for thirty minutes in a separatory funnel. The mixture is then washed three to four times at 60° C.–80° C. with water, one of the water washes containing 0.5 gram of the tetrasodium salt of ethylenediaminetetraacetic acid. Analysis for water soluble salts (WSS) remaining in the product indicates 6 p.p.m. Substantially the same results are afforded using 0.2 gram of the tetrasodium salt of ethylenediamine tetraacetic acid in the lye wash and 0.16 gram in the water wash.

EXAMPLE 3

360 grams of crude phosphate is initially washed with a solution of 14 grams of aqueous 50% sodium hydroxide and 1.5 grams of the tetrasodium salt of ethylenediaminotetraacetic acid in 350 grams water. The mixture is heated to 60° C., held for thirty minutes and allowed to settle for thirty minutes in a separatory funnel. The lye wash is then followed by three to four water washes at a temperature of 75° C. to 80° C., one of the water washes containing 0.5 gram of the tetrasodium salt of ethylenediaminetetraacetic acid, WSS=5 p.p.m. Substantially the same results are afforded using 18 grams of the tetrasodium salt of ethylenediaminetetraacetic acid divided between the lye and water washes.

EXAMPLE 4

360 grams of crude phosphate is initially washed with a solution of 14 grams of a 50% sodium hydroxide solution and 2 grams of the tetrasodium salt of ethylenediaminetetraacetic acid in 350 grams water. The wash solution is heated to 60° C. held for thirty minutes and then allowed to separate for thirty minutes. The oil layer is then washed four times with 360 gram portions of water, one portion containing 2 grams of the tetrasodium salt of ethylenediaminetetraacetic acid, WSS=1 p.p.m. Substantially the same results are afforded by using 36 grams of the tetrasodium salt of ethylenediaminetetraacetic acid distributed among the lye and water washes.

EXAMPLE 5

360 grams of crude phosphate is washed initially with a solution of 14 grams 50% sodium hydroxide and 0.4 gram triethanolamine in 355 grams water. The wash solution is heated to 60° C. for thirty minutes and then allowed to settle for thirty minutes. The oil layer is then separated and washed three times with 360 gram portions of water, one of which contains 0.4 gram triethanolamine, WSS=31 p.p.m.

EXAMPLE 6

360 grams of crude phosphate is initially washed with a 360 gram aqueous solution containing 7 grams 50% sodium hydroxide and 1 gram tetrasodium salt of ethylenediaminetetraacetic acid. The wash solution is heated to 60° C., held for thirty minutes and allowed to settle for thirty minutes. The oil layer is then washed with four 360 gram portions of water, one of which contains 0.2 gram triethanolamine, WSS=15 p.p.m.

EXAMPLE 7

360 grams of crude phosphate is initially washed with a 355 gram aqueous solution containing 8 grams 50% sodium hydroxide, 1.3 grams tetrasodium salt of ethylenediaminetetraacetic acid and 0.2 gram triethanolamine. The wash solution is heated to 60° C., held for thirty minutes and settled for thirty minutes on a separatory funnel. The oil layer is then washed with four 360 gram portions of water, WSS=25 p.p.m.

EXAMPLE 8

360 grams crude phosphate is initially washed with a 355 gram aqueous solution containing 8 grams 50% sodium hydroxide. The wash solution is heated to 60° C. for thirty minutes and allowed to settle for thirty minutes. The oil is separated and washed four times with 360 gram portions of water, the first wash containing 1.3 grams tetrasodium salt of ethylenediaminetetraacetic acid and 0.2 gram of triethanolamine, WSS=14 p.p.m.

EXAMPLE 9

360 grams of crude phosphate is initially washed with a 355 gram aqueous solution containing 8 grams of 50% sodium hydroxide, 1 gram tetrasodium salt of ethylenediaminetetraacetic acid and 0.15 gram triethanolamine. The wash solution is heated to 60° C. and held for thirty minutes. After settling for thirty minutes, the oil is separated and washed four times with 360 gram portions of water, one of the water washes containing 0.5 gram tetrasodium salt of ethylenediaminetetraacetic acid and 0.25 gram triethanolamine.

EXAMPLE 10

Continuous washing of crude phosphate is accomplished using a rotating disc column having a capacity of 1.5 liters in the mixing section of the column having 35 stages. The phosphate ester is fed to the column at a rate of 1,000 to 1,100 milliliters per hour and a 1% lye solution containing 0.2% triethanolamine and 0.4% tetrasodium salt of ethylenediaminetetraacetic acid is fed to the column at the rate of 900 to 1,000 milliliters per hour. Washing the crude phosphate ester in this manner allows for continuous pumping of phosphate ester at the rate of 1,000 to 1,100 milliliters per hour. Previous to washing with a solution containing the wash-improving agents, the highest pumping capacity to the column was at the rate of approximately 250 to 300 milliliters per hour. Only one water wash is necessary to free the phosphate solution of soluble salts after exiting from the column, WSS=13 p.p.m.

EXAMPLE 11

500 grams of crude phosphonate is washed initially at 40° C. with a solution of 10 grams 50% sodium hydroxide, 0.5 gram of the tetrasodium salt of ethylenediaminetetraacetic acid and 0.5 gram of triethanolamine in 500 grams water. The solution is stirred for fifteen minutes and allowed to separate for thirty minutes. The oil layer is then washed three times with 500 gram portions of water, the first portion containing 0.5 gram of the tetrasodium salt of ethylenediaminetetraacetic acid and 0.5 gram triethanolamine.

EXAMPLE 12

1,000 grams of crude phosphinate is washed initially for ten minutes at 25° C. with a solution of 20 grams 50% sodium hydroxide, 0.8 gram of the tetrasodium salt of ethylenediaminetetraacetic acid and 0.5 gram triethanolamine in 1,000 grams water. The product layer is then washed three times at 25° C. with 1,000 gram portions of water, the first portion containing 0.5 gram triethanolamine.

EXAMPLE 13

360 grams of crude phosphorothioate is initially washed with a solution of 7 grams of an aqueous 50% lye solution and 1.5 grams of the tetrasodium salt of ethylenediaminetetraacetic acid in 355 grams water. The washing solution is combined with the crude thiophosphate ester at 55° C. to 60° C. and held for thirty minutes. The mixture is allowed to settle for thirty minutes in a separatory funnel. The mixture is then washed three to four times at 50° C.–80° C. with water, one of the water washes containing 0.5 gram of the tetrasodium salt of ethylenediamine tetraacetic acid. Analysis for water soluble salts (WSS) indicates 6 p.p.m. Substantially the same results are afforded using 0.2 gram of the tetrasodium salt of ethylenediaminetetraacetic acid in the lye wash and 0.16 gram in the water wash.

EXAMPLE 14

360 grams of crude phosphorodithioate is initially washed with a solution of 14 grams of a 50% sodium hydroxide solution and 2 grams of the tetrasodium salt of ethylenediamine tetraacetic acid in 350 grams water. The wash solution is heated to 60° C., held for thirty minutes and then allowed to separate for thirty minutes. The oil layer is then washed four times with 360 gram portions of water, one portion containing 2 grams of the tetrasodium salt of ethylenediaminetetraacetic acid, WSS=1 p.p.m. Substantially the same results are afforded by using 36 grams of the tetrasodium salt of ethylenediaminetetraacetic acid distributed among the lye and water washes.

EXAMPLE 15

360 grams of crude phosphorotrithioate is initially washed with a 360 gram aqueous solution containing 7 grams 50% sodium hydroxide and 1 gram tetrasodium salt of ethylenediaminetetraacetic acid. The wash solution is heated to 60° C., held for thirty minutes and allowed to settle for thirty minutes. The oil layer is then washed with four 360 gram portions of water, one of which contains 0.2 gram triethanolamine, WSS=15 p.p.m.

EXAMPLE 16

500 grams of crude phosphonothioate is washed initially at 40° C. with a solution of 10 grams 50% sodium hydroxide, 0.5 gram of the tetrasodium salt of ethylenediaminetetraacetic acid and 0.5 gram of triethanolamine in 500 grams water. The solution is stirred for fifteen minutes and allowed to separate for thirty minutes. The oil layer is then washed three times with 500 gram portions of water, the first portion containing 0.5 gram of the tetrasodium salt of ethylenediaminetetraacetic acid and 0.5 gram triethanolamine.

EXAMPLE 17

1,000 grams of crude phosphinothioate is washed initially for ten minutes at 25° C. with a solution of 20 grams 50% sodium hydroxide, 0.8 gram of the tetrasodium salt of ethylenediaminetetraacetc acid and 0.5 gram triethanolamine in 1,000 grams water. The product layer is then washed three times at 25° C. with 1,000 gram portions of water, the first portion containing 0.5 gram triethanolamine.

While the invention has been described hereinabove with regard to certain illustrative specific embodiments, it is not so limited since many modifications and variations are possible in the light of the above teachings. It is understood, therefore, that the invention may be practiced otherwise than as specifically described without departing from the spirit and scope of the invention.

The embodiments of this invention in which a particular property or privilege is claimed are defined as follows:

1. In a method of refining a crude organophosphorus ester of the formula

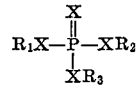

wherein $R_1$, $R_2$ and $R_3$ individually represent alkyl, aryl, alkaryl, aralkyl, haloalkyl, haloaryl, nitroalkyl, nitroaryl, alkoxyalkyl, cyanoaryl, haoalkaryl and alkylthioalkyl and X represents oxygen, sulfur or a carbon-phosphorus bond, at least two of X being oxygen or sulfur, the improvement which comprises washing said ester with a water or aqueous lye solution containing an agent capable of inhibiting the formation of metal ion/partial ester complexes during said washing.

2. The method of claim 1 wherein said ester is a phosphate or a phosphorothioate.

3. The method of claim 1 wherein said ester is a phosphonate or a phosphonothioate.

4. The method of claim 1 wherein said ester is a phosphinate or a phosphinothioate.

5. The method of claim 1 wherein said solution is water.

6. The method of claim 1 wherein said solution is aqueous sodium hydroxide.

7. The method of claim 1 wherein said agent is selected from the group consisting of alkyleneaminoacetic acids, N-hydroxyethyleneaminoacetic acids, nitriloacetic acids, alkanol glycines, gluconic acid lactones and the sodium, potassium and calcium salts thereof, including mixed salts and alkanolamines.

8. The method of claim 7 wherein said alkyleneaminoacetic acids are ethylenediaminetetraacetic acid and diethylenetriaminepentaacetic acid.

9. The method of claim 7 wherein said N-hydroxyethyleneaminoacetic acid is N-hydroxyethylenediaminoacetic acid.

10. The method of claim 7 wherein said nitriloacetic acid is nitrilotriacetic acid.

11. The method of claim 7 wherein said lactones are the gamma and delta lactones of gluconic acid.

12. The method of claim 7 wherein said alkanolamine is triethanolamine.

13. The method of claim 1 wherein said ester is a phosphate or phosphorothioate and said solution is water or aqueous sodium hydroxide.

14. The method of claim 13 wherein said agent is ethylenediaminetetracetic acid.

15. The method of claim 13 wherein said agent is triethanolamine.

References Cited

UNITED STATES PATENTS 2,573,658  10/1951  Weesner _____ 260—990
3,059,015  10/1962  Pickard et al. _____ 260—990

LEWIS GOTTS, Primary Examiner

R. L. RAYMOND, Assistant Examiner

U.S. Cl. X.R.

260—940, 948, 950, 951, 954, 961, 964, 965, 966